(No Model.)

L. G. THORP.
Oatmeal Machine.

No. 241,249.      Patented May 10, 1881.

Witnesses:
F. C. Bryan
E. W. Stuart

Inventor:
Lucien G. Thorp,
by C. P. Humphrey
Atty.

UNITED STATES PATENT OFFICE.

LUCIEN G. THORP, OF AKRON, OHIO.

OATMEAL-MACHINE.

SPECIFICATION forming part of Letters Patent No. 241,249, dated May 10, 1881.

Application filed May 19, 1880. (No model.)

*To all whom it may concern:*

Be it known that I, LUCIEN G. THORP, of Akron, in the county of Summit and State of Ohio, have invented a new and useful Improvement in Oatmeal-Machines, of which the following is a specification.

My invention has relation to that class of oatmeal-machines wherein the hulled kernels of oats are, by shearing-edges, cut transverse to their longer axes into coarse meal.

The objects of my invention are to hold the kernels in position to be cut, and to rapidly cut them into meal without crushing or breaking down the structure of the kernel. I attain these objects by the mechanism illustrated in the accompanying drawings, in which—

Figure 1:
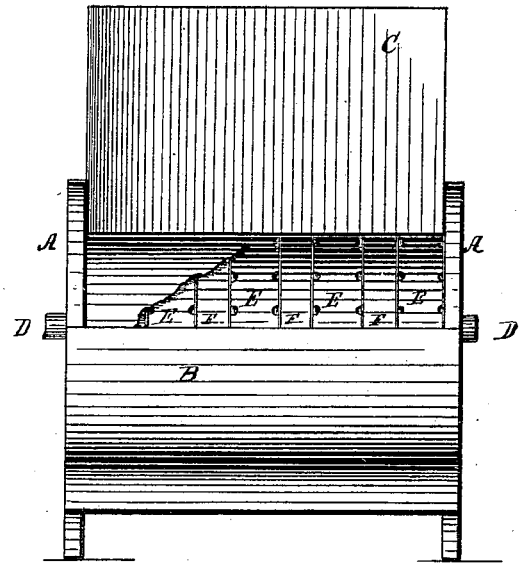
Figure 3:
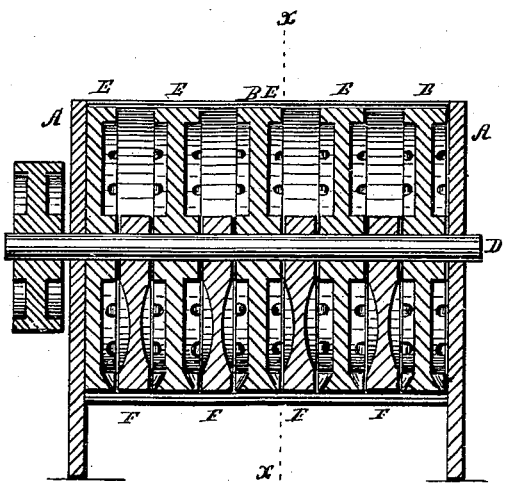
Figure 2:
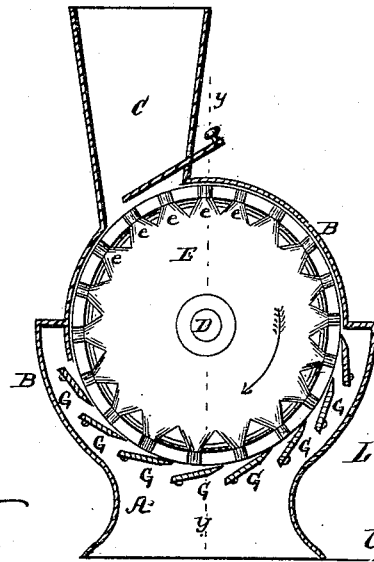

Figure 1 is an elevation of the machine with a portion of the outer casing cut away; Fig. 2, a vertical transverse section at the line $x\ x$ of Fig. 3, and Fig. 3 a vertical longitudinal section at the line $y\ y$ of Fig. 2.

Similar letters refer to similar parts throughout the several views.

The frame-work of the machine consists of two end pieces, A A, of the form shown in Fig. 2, connected by a thin shell of wood or metal, and constituting a casing for the operative parts.

Journaled in the ends A A is a shaft, D, to which motion is communicated by a pulley attached to one end thereof.

Between the ends A A a number of wheels, E E, with projecting rims, are mounted upon and adapted to revolve with the shaft D. In each edge of the rim of said wheels are radial grooves $e\ e$, of such size as to permit of the passage endwise through them of hulled kernels of oats, said grooves being preferably constructed of even diameter for a short distance from the periphery inward, and thence rapidly expanding toward the center of the wheel.

Between the wheels E E are partial partitions F F, concentric with the wheels, and fixed within the machine. These partitions extend from the lower portion of the wall of the shell or casing slightly above the shaft D, and are preferably concave upon either side, to afford greater room for the passage of oats; or, if desired, they may be segments of wheels similar to the wheels E E, omitting the grooves in the rim, and given a motion about the shaft D in a direction opposite to that of the wheels E E. The shell or case B lies close to the periphery of the wheels E E about the upper portion of the machine, but from about the horizontal center line downward is separated a considerable distance therefrom. Within the space so formed a series of knives, G G, extend between the end pieces, A A, with their edges close to the periphery of the wheels E E and partitions F F, said knives being in planes substantially tangential to the wheels E E.

In operation, motion being communicated to the wheels E E, hulled kernels of oats are fed into the hopper C, and passing thence into the machine fall between the wheels and partitions. Thence, being constantly agitated by the revolution of the wheels, they singly pass endwise into the grooves $e\ e$, but by contact with the surface of the knives G G are prevented from falling through until the projecting portions are cut off by the edges of the next knife.

I am aware that in oatmeal-machines a horizontal rotary disk has been provided with radial grooves, through which the grain is forced by centrifugal action to the peripheries, where it is cut by stationary knives, and I do not claim such construction. My machine does not depend on centrifugal action for the feed, but upon gravity and agitation of the grain.

I claim—

1. An oatmeal-machine consisting of a series of wheels with projecting rims indented with radial grooves and revolving vertically between partial partitions in a suitable shell, and one or more knives with their edges close to the peripheries of said wheels, substantially as described.

2. The combination, with the shell and partial partitions F, of the series of vertical wheels E, mounted on the rotary shaft, and having the grooves $e$ in their edges, and the inclined knives G, having their edges close to the peripheries of said wheels, substantially as described.

In testimony that I claim the foregoing I have hereunto set my hand this 1st day of may, A. D. 1880.

LUCIEN G. THORP.

Witnesses:
C. P. HUMPHREY,
E. W. STUART.